Patented Aug. 17, 1943

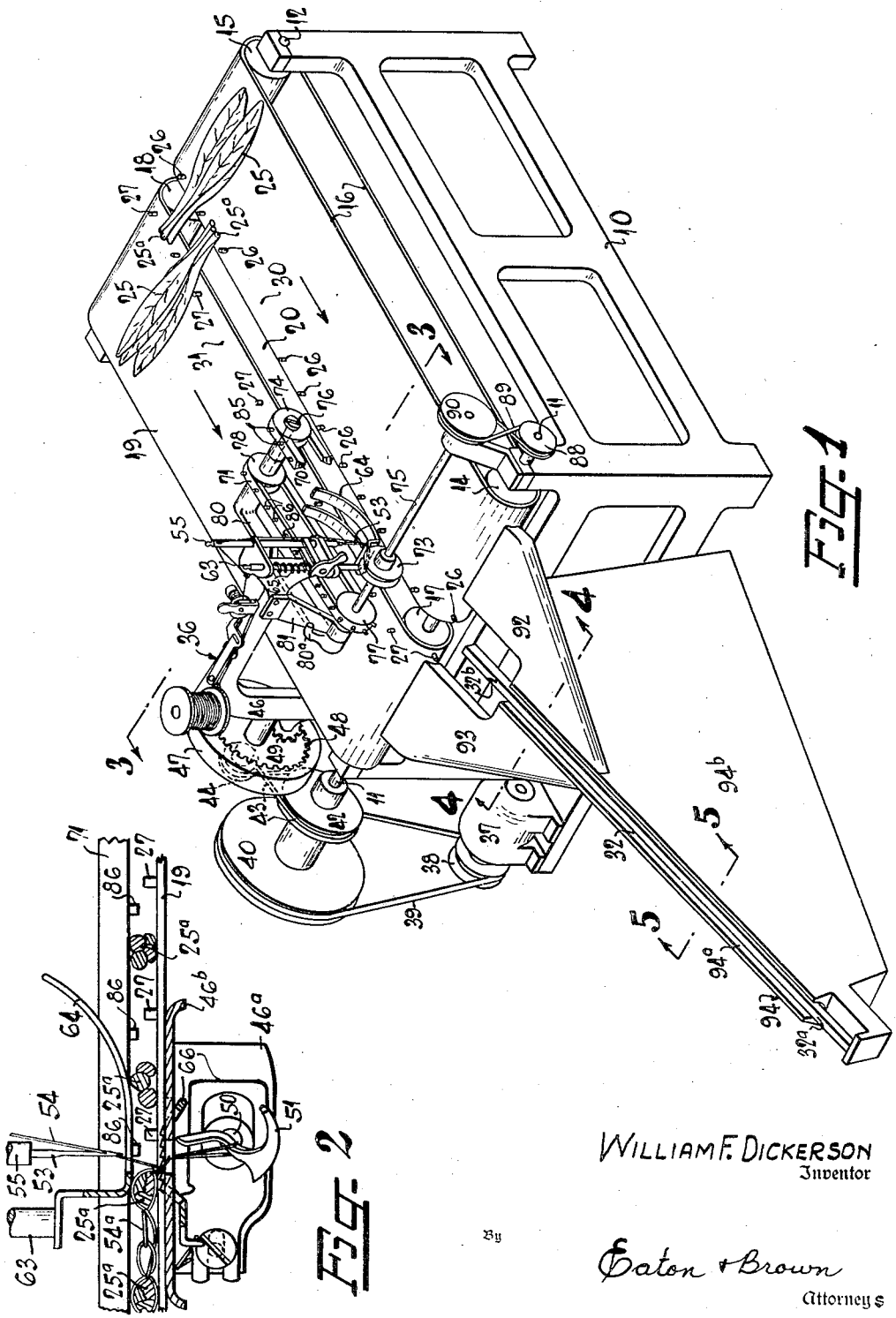

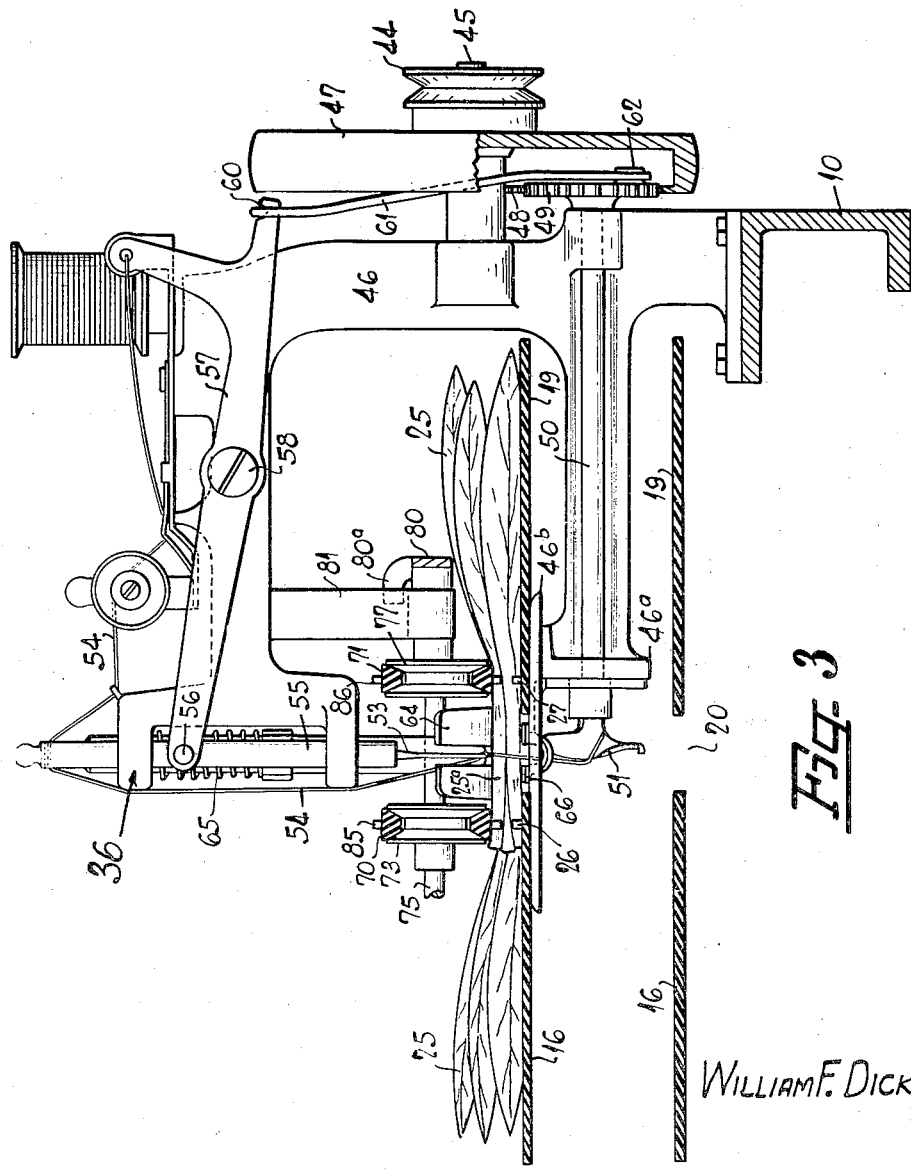

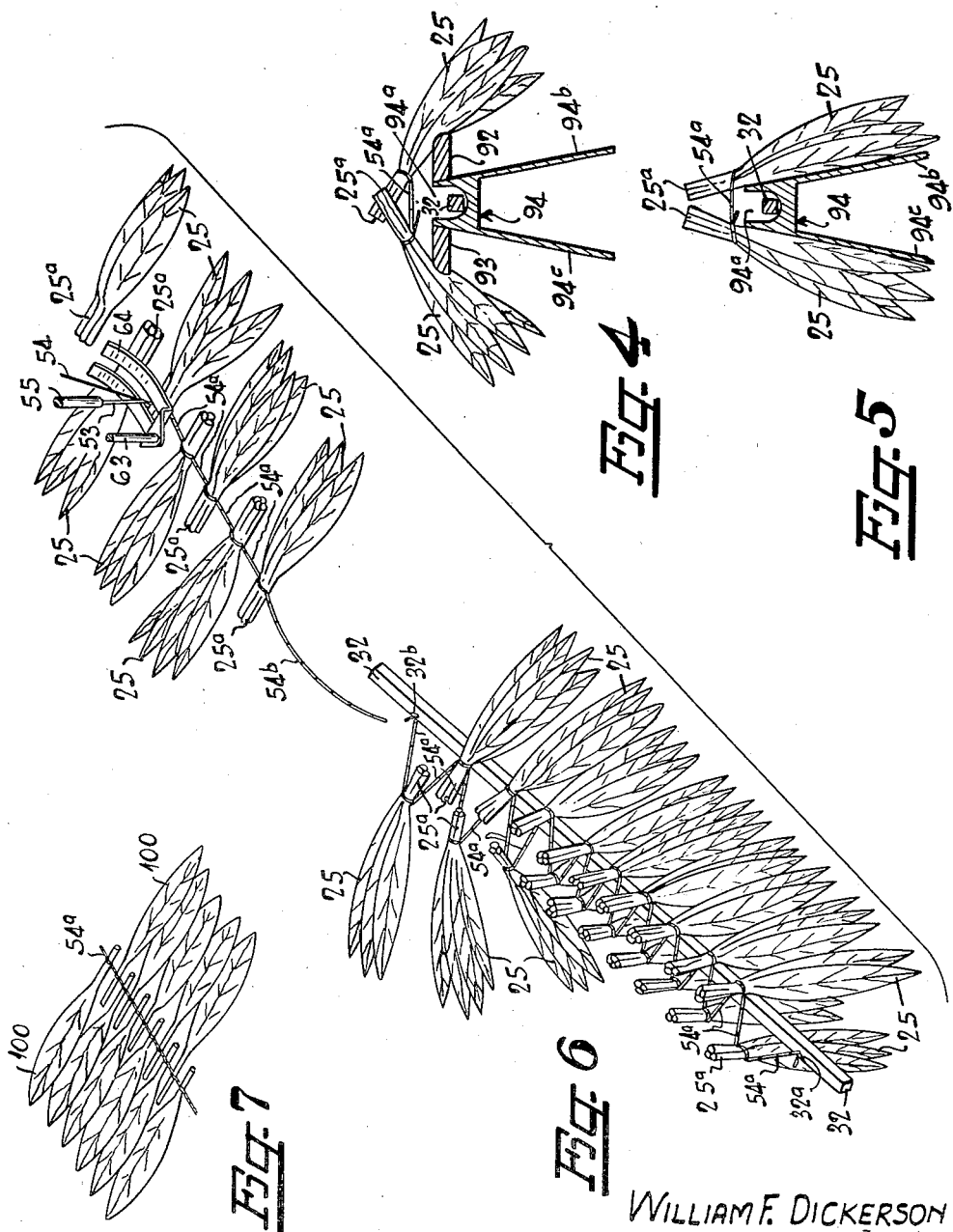

2,327,252

UNITED STATES PATENT OFFICE 2,327,252

APPARATUS AND METHOD OF STRINGING TOBACCO

William F. Dickerson, Hamptonville, N. C.

Application April 9, 1942, Serial No. 438,259

13 Claims. (Cl. 214—5.5)

This invention relates to an improved method and means for suspending green tobacco and the like upon supporting sticks during the harvesting operation so that it can be placed in barns and cured.

It is a well known fact that the lowermost leaves on tobacco plants ripen first, and as the season progresses, the adjacent higher leaves ripen, resulting in the top plant leaves ripening last. Therefore, the leaves must be harvested from time to time as they become ripe. When the leaves are broken from the plants it is then necessary to suspend them in a loose manner so that the air will have access to all portions during the drying and curing operations. In many cases, this suspension is effected by attaching the butt ends of the leaves to sticks by the use of a string or other means and then the sticks are placed in spaced relation upon supports while the drying and curing operations are in progress. Heretofore, this suspending operation, or hanging the leaves on the sticks has slowed down harvesting of tobacco, since it is generally performed manually at a relatively slow rate compared to the time consumed in the other operations. The machines designed to accomplish this purpose as a rule, have been unsuccessful due to the complication of mechanical parts and the inefficient methods employed which tend to tear and bruise the leaves before curing.

It is an object of this invention to provide a simple method and mechanism for quickly suspending tobacco on sticks, which requires a minimum amount of handling, thereby preventing the tobacco from being damaged and bruised. The leaves are preferably gathered in bunches and then positioned transversely upon adjacent flush top conveyor belts in such a manner that the butt ends of alternate bunches will propect in opposite directions and will also overlap alongside each other. Then the overlapping butt ends are united by any suitable mechanism such as looping or sewing machine as the belts move the bunches successively past the uniting mechanism. After the butts are united the free ends of the bunches are successively permitted to alternately fall by gravity from horizontal positions to substantially vertical positions on opposed sides of a supporting stick.

If desired, the leaves can be arranged as above outlined, excepting that instead of having the leaves in bunches they can be spread out into two continuous layers with the butts of the two rows of leaves overlapping each other, and being disposed side by side.

It is another object of this invention to provide an improved tobacco stringing apparatus for carrying out the above-named method, said apparatus being characterized by its simplicity of design, coupled with efficiency of operation and a minimum amount of damage to the handled product.

Some of the objects of the invention having been stated, other objects will appear as the description proceeds, when taken in connection with the accompanying drawings, in which—

Figure 1 is an isometric view of my improved tobacco stringing apparatus;

Figure 2 is a sectional view illustrating the position of the tobacco as it is being attached to a string by any suitable means such as a sewing machine or looping device;

Figure 3 is a transverse sectional view taken along the line 3—3 in Figure 1;

Figure 4 is a transverse sectional view taken along the line 4—4 in Figure 1, illustrating the position of the tobacco leaves after the butts have been attached to a string and while the free ends of the leaves are being rotated to suspended positions on opposed sides of a stick;

Figure 5 is a sectional view taken along the line 5—5 in Figure 1, showing the strung tobacco in suspended position prior to raising the stick to a position where it will support the same;

Figure 6 is an isometric detail view illustrating the positions of the tobacco while the same is being attached to a string and also while it is being suspended upon a supporting stick;

Figure 7 is an isometric view showing a slightly different method of attaching tobacco leaves to a strand.

Referring more particularly to the drawings, the numeral 10 denotes a framework, which has rotatably mounted in the upper portion thereof, suitable shafts 11 and 12. Suitable rollers 14 and 15 are respectively fixed upon shafts 11 and 12, and upon these rollers a belt 16 is mounted. Also fixed upon the shafts 11 and 12 are rollers 17 and 18, respectively upon which a second belt 19 is mounted, said belts 16 and 19 being substantially the same length and also being flush-top. It will be noted that the proximate edges of the belts 16 and 19 are parallel and disposed apart from each other thereby forming a space 20 therebetween.

In order to provide a suitable spacing means for bunches of tobacco such as designated by the reference character 25, suitable projections 26 and 27 are anchored near the proximate edges of belts 16 and 19 respectively. These projections 26 and 27 are so spaced that a predetermined number of hands or bunches of tobacco leaves 25 may be placed thereon during a complete revolution. Also it will be noted that the projections 26 and 27 are not spaced the entire length of the belt, but instead a number of these projections are eliminated as at 30 and 31 respectively, so that each series of attached bunches 25 will have an elongated connecting strand therebetween which may be severed and used for securing the ends of each series to a support such as a stick 32. In other words, a series of connected bunches 25 is formed, each time the belts 16 and 19 make a complete revolution, and then a substantial length 54b formed from string 54 is provided between the trailing end of the completed series and the beginning of the next succeeding series. This length 54b of the string is approximately the same length as one of the spaces 30 and 31.

In order to attach the string 54 to the butts or bunches 25, it is necessary to simultaneously move both of the belts 16 in the same direction so that a suitable sewing or looping mechanism broadly designated by the reference character 36 may unite the butt ends of these bunches. The driving mechanism for the belts 16 and 19 may be any suitable design, such as motor 37, said motor having a pulley 38 upon which a belt 39 is mounted. This belt is also mounted upon a larger pulley 40 on one end of shaft 11. The relative sizes of pulleys 38 and 40 must be such that the proper speed reduction will be effected so that the belts 16 and 19 will travel at the desired rate of speed.

Simultaneously with the operation of the belts 16 and 19 the sewing or looping mechanism 36 also operates. This mechanism is driven by the same motor 37 and its driving mechanism includes a suitable pulley 42 which is fixedly secured upon shaft 11, said pulley 42 having a belt 43 mounted thereon. The belt 43 is also mounted upon a smaller pulley 44 which is rotatably mounted as at 45 (Figure 3) upon a suitable frame 46 of sewing or looping machine 36. Integral with the pulley 44 is a wheel 47 having an internal gear 48 which meshes with a pinion 49 on a looper shaft 50. This looper shaft is likewise rotatably mounted in the framework 46 and has secured on one end thereof a conventional looping finger 51. Simultaneously with the operation of the finger 51, it is necessary that a needle such as designated by 53 be operated to thereby cause a string or thread 54 to be looped and thereby form link 54a between the butts 25a of the tobacco bunches 25.

The needle 53 is supported in the lower end of a vertically reciprocable shaft 55 in framework 46. Secured to shaft 55 as at 56 is a bar 57 which is pivoted intermediate its ends as at 58 to the framework 46. The other end of the bar 57 has secured thereto as at 60 the upper end of a link 61, said link extending downwardly and being pivotally secured as at 62 to pinion 49, previously described. Since the point 62 is eccentrically located relative to the shaft 50, it is evident that when the gear 49 rotates, oscillation will be imparted to bar 57 to cause the shaft 55 and needle 53 to reciprocate during a looping operation.

The framework 46 also has reciprocably mounted therein another vertically disposed shaft 63 which has a presser foot 64 disposed on the lower end thereof. This presser foot is normally forced downwardly by any suitable means such as a spring 65, and thereby caused to yieldingly engage the upper portion of butts 25a while the sewing or looping operation is taking place. The presser foot 64, the looping finger 51 and the needles 53 work in synchronism with a conventional oscillating feeder bar 66 to cause the butts 25a to be fed through the sewing machine in the proper manner. The bed portion of the sewing machine which carries the shaft 59 is disposed between the upper and lower portions of belts 16 and 19.

As a means for holding the bunches of tobacco 25 in the proper position while approaching the presser foot 64, another pair of belts 70 and 71 is provided. These belts 70 and 71 are disposed directly above the proximate edges of belts 16 and 19, respectively, and on opposed sides of the presser foot. The belt 70 is mounted upon pulleys 73 and 74 which, in turn, are mounted upon shafts 75 and 76, respectively. Likewise, belt 71 is mounted upon pulleys 77 and 78 respectively, upon the same shafts 75 and 76. The shaft 76 extends horizontally from an arm 80, and this arm has one end thereof pivotally mounted around the shaft 75 which in turn has one end supported by means of a suitable bracket 81.

By mounting the arm 80 in the position described, the free end thereof may be swung about shaft 75 as the center. This movement will permit the pulleys 74 and 78 and belts 70 and 71 to move up and down to compensate for the variable thicknesses of the tobacco bunches 25.

It will be noted that the belts 70 and 71 have suitable projections 85 and 86 respectively extending therefrom which cooperate with projections 26 and 27 therebelow on belts 16 and 19. When the butt ends 25a of the tobacco leaves pass between the belts 16 and 70 and also between belts 19 and 71, a gripping action is effected to thereby gently compress the tobacco butts sufficiently to cause them to move beneath the presser foot 65.

The driving mechanism for the belts 70 and 71 comprises a pulley 88 which is fixedly secured upon shaft 11, and this pulley has a belt 89 mounted thereon, said belt being also mounted upon another pulley 90 on the shaft 75.

During the operation of the stringing apparatus, one or more persons are engaged in placing bunches 25 of tobacco upon belts 16 and 19 in substantially the position as shown in Figure 1. In other words, it is desirable that the butt ends 25a of the hands 25 be placed so that the butts of alternate bunches will project in opposite directions and also extend in overlapping position alongside each other across the space 20. As the belts 16 and 19 move in the direction of the arrows, the butts 25a will first be engaged by the belts 70 and 71 and subsequently, drawn beneath presser foot 64 where the thread 54 will be looped or sewed to form a connected series of hands or bunches of tobacco. In the present instance, the thread 54 is shown as being looped, thereby forming looped lengths 54a between each of the butts 25a and also looped lengths 54b between each of the series of connected bunches.

Figure 6 illustrates the position of the hands or bunches 25 prior to being sewed, while being sewed, and while being positioned upon the stick 32. It is here seen that the connecting hands remain substantially in a horizontal position for a short time after the butt ends 25a have been united or looped, and then the free ends of the connected bunches are allowed to move downwardly over triangular board members 92 and 93, said board members having the upper ends thereof disposed adjacent the ends of conveyor belts 16 and 19 respectively. As the connected bunches move downwardly, the overall supporting width of the board members 92 and 93 decreases, thereby permitting the free ends of each bunch to rotate by gravity through an angle of 90 degrees to occupy suspended positions on opposed sides of a trough-like member 94. The proximate edges of the board members 92 and 93 are secured to the upper opposed sides of inclined trough-like member 94, said trough like member having a groove 94a therein for removably receiving a tobacco stick 32 previously described. As the connected series of bunches 25 are fed downwardly from the triangular board members 92 and 93, the free ends gradually move inwardly and fall against inclined sidewalls 94b and 94c of the trough-like member 94, (Figures 1, 4 and 5).

Upon the series of bunches 25 being connected together, the thread 54 is looped for a longer distance than the distance between the adjacent butts 25a. In other words, length 54b is formed between adjacent series which lengths may be severed and utilized for attaching the same to the stick 32. The position of the bunches of tobacco while being attached to the stick 32 is also shown in Figure 6, and it is here seen that the stick has suitable notches 32a and 32b cut near the ends thereof for receiving the severed strand lengths 54b. After securing lengths 54b in the notches 32a and 32b, the stick 32 and suspended bunches 25 are raised from the groove 94a and then an empty stick is inserted for receiving the next series of connected bunches.

It is therefore seen that a continuous operation can be effected, it being necessary for one person to place the empty stick 32 in the groove 94a and to remove the same when a series of bunches have been secured thereto, while another person arranges leaves upon belts 16 and 19. By providing a looping mechanism such as shown in the drawings, the tobacco may also be removed from the stick when desired, by detaching the string from the notches 32b and unraveling the loop. The type of sewing machine preferred is the chain stitch type, wherein the string can be pulled and quickly unraveled after the tobacco is cured and prior to its being graded and made into hands for the market.

If desired, individual leaves 100 may be positioned on belts 16 and 19 very much in the same manner that bunches 25 are placed and united by loop strand 54a. However, when placing individual leaves and bunches on the belts, it will be necessary to space the same much closer together, and therefore, the projections 26 and 27 on the belts 16 and 19 will not act as spacer members. It should be kept in mind, that the butts of alternate leaves should project in opposite directions and in overlapping relation alongside each other just as in the preceding form. By employing this method the finished product will be substantially as shown in Figure 7 prior to placing the same upon a supporting means such as a stick 32.

In the drawings and specification, there has been set forth a preferred embodiment of the invention and although specific terms are employed, they are used in a generic and descriptive sense only and not for purposes of limitation, the scope of the invention being defined in the claims.

I claim:

1. Apparatus for stringing green tobacco leaves on a stick preparatory to a curing operation, comprising a sewing machine having looping mechanism for forming a continuous string, means for conveying two rows of tobacco leaves with their butt ends in overlapping staggered relation past the looping mechanism to join the leaves by the formation of the continuous string, means for supporting a stick in the path of movement of the connected leaves and below the line formed by the string, so that when relative vertical movement between the stick and the leaves is effected the leaves on one side of the seam will be disposed on one side of the stick and the leaves on the other side of the seam will fall on the other side of the stick.

2. In a tobacco stringing apparatus, the combination of a pair of flush-top conveyor belts for supporting transversely disposed bunches of tobacco leaves, the bunches on one belt being overlapped and alternately spaced with the bunches on the other belt, sewing means for forming a straight chain-stitch line of stitches between said belts, and means for advancing said belts and bunches past said sewing means, thereby forming a connected seam through and between the bunches.

3. In a tobacco stringing apparatus, the combination of a pair of spaced flush top conveyor belts for supporting transversely disposed spaced bunches of tobacco leaves, the butt ends of alternately disposed bunches projecting in opposite directions and across a medial line between the proximate edges of the belts, means for simultaneously advancing said belts, and means for forming a line of chain stitches through and between the bunches for attaching said bunches to a string along said line medially between said belts as the belts advance.

4. In a tobacco stringing apparatus, the combination of means for supporting a group of substantially parallel spaced bunches of tobacco, means for supporting a second group of substantially parallel spaced bunches of tobacco with their butts in overlapping staggered relation to the butts of the said first group, means for simultaneously advancing said supporting means transversely of the longitudinal axis of said bunches, and means for forming a line of chain stitches through and between the bunches for attaching said bunches to a string along a line medially of the overlapping portions of the bunches as the supporting means advance.

5. In a tobacco stringing apparatus, the combination of a pair of flush-top conveyor belts for supporting transversely disposed bunches of tobacco leaves, the bunches on one belt being overlapped and alternately spaced with the bunches on the other belt, sewing means between said belts, means for advancing said belts and bunches past said sewing means thereby forming a connected seam through and between the bunches, and means for removably supporting a downwardly inclined stick below the seam line and adjacent the conveyor belts, whereby the free ends of alternate connected bunches will fall by gravity on opposed sides of the stick while moving longitudinally thereof and after leaving the conveyor belts.

6. In a tobacco stringing apparatus, the combination of a pair of spaced flush-top conveyor belts for supporting transversely disposed spaced hands of tobacco leaves, the butt ends of the hands on one conveyor belt projecting in an opposite direction to the butts of the hands of the other conveyor belt, and across a medial line between the proximate edges of the belts, means for simultaneously advancing said belts, means for attaching said hands to a string along a line medially between said belts as the belts advance, and a stick supported below said attaching string, said stick being downwardly inclined from the ends of the conveyor belts whereby the free ends of alternate connected hands will fall by gravity on opposed sides of the stick while moving longitudinally thereof after leaving the conveyor belts.

7. In a tobacco stringing apparatus, the combination of means for supporting a group of substantially parallel spaced leaves of tobacco, means for supporting a second group of substantially parallel spaced leaves of tobacco in overlapping staggered relation to said first group, means for simultaneously advancing said supporting means transversely of the longitudinal axis of said hands, means forming a string and for attaching said leaves to the string along a line medially of the overlapping portions of the leaves as the supporting means advance, and a removable stick inclined downwardly from said supporting means and being disposed below said attaching string whereby the free ends of alternate connected leaves will fall by gravity on opposed sides of the stick while moving longitudinally thereof after leaving said supporting means.

8. That method of stringing tobacco leaves which comprises positioning a leaf on a planar surface, positioning a second leaf on said planar surface with its butt end projecting in an opposite direction and overlapped alongside the butt of the first leaf, then positioning a third leaf on said planar surface with the butt projecting in an opposite direction and overlapped alongside the butt of the second leaf, continuing said positioning operations, and securing a thread to said overlapped butts.

9. That method of stringing tobacco leaves on sticks which comprises positioning a leaf on a planar surface, positioning a second leaf on said planar surface with its butt end projecting in an opposite direction and overlapped alongside the butt of the first leaf, then positioning a third leaf on said planar surface with the butt projecting in an opposite direction and overlapped alongside the butt of the second leaf, continuing said positioning operations, then securing a thread to said overlapped butts, moving said secured leaves while in planar position to a superposed position relative to a stick and then permitting the free ends of the leaves to alternately fall by gravity on opposed sides of the stick.

10. That method of suspending bunches of tobacco upon a stick which comprises positioning tobacco upon a planar surface so that the butt ends of alternate bunches will project in opposite directions and in overlapping position alongside each other, securing the overlapped butt ends together by a string, placing a stick beneath the uniting string and then advancing the connected bunches so that alternate bunches will fall in opposite directions about the stick as a pivot.

11. That method of suspending bunches of tobacco upon a stick which comprises positioning the butt ends of alternate bunches in opposite directions and in overlapping position alongside each other, successively moving the butt ends of the positioned bunches transversely beneath a sewing machine to unite the same, by a continuous looped seam and then successively lowering the free ends of the united bunches alternately on opposed sides of a stick, and then securing the ends of the same to the end portions of the stick.

12. That method of uniting tobacco leaves prior to a curing operation which comprises disposing the leaves in two adjacent parallel rows located in the same plane with the butts of the leaves in one row overlapping the butts of the leaves in the other row, forming a seam connecting the two rows and then placing the two connected rows of leaves on a stick at the seam line so that the leaves of the two rows will occupy positions on opposed sides of the stick.

13. Apparatus for securing spaced bunches of tobacco leaves together and for placing the bunches astride a stick, comprising means for supporting two rows of bunches of leaves in a horizontal plane with the butts of the leaves of one row being in overlapping side by side relation to the butts of the other row, means for forming a line of looped stitches passing through the butts of the bunches and connecting the butts of the two rows together, means for supporting a stick and means for guiding the rows along each side of the stick so that when the stick is raised the bunches of one row will be disposed on one side of the stick and the bunches of the other row will be disposed on the other side of the stick.

WILLIAM F. DICKERSON.